United States Patent Office 3,721,826
Patented Mar. 20, 1973

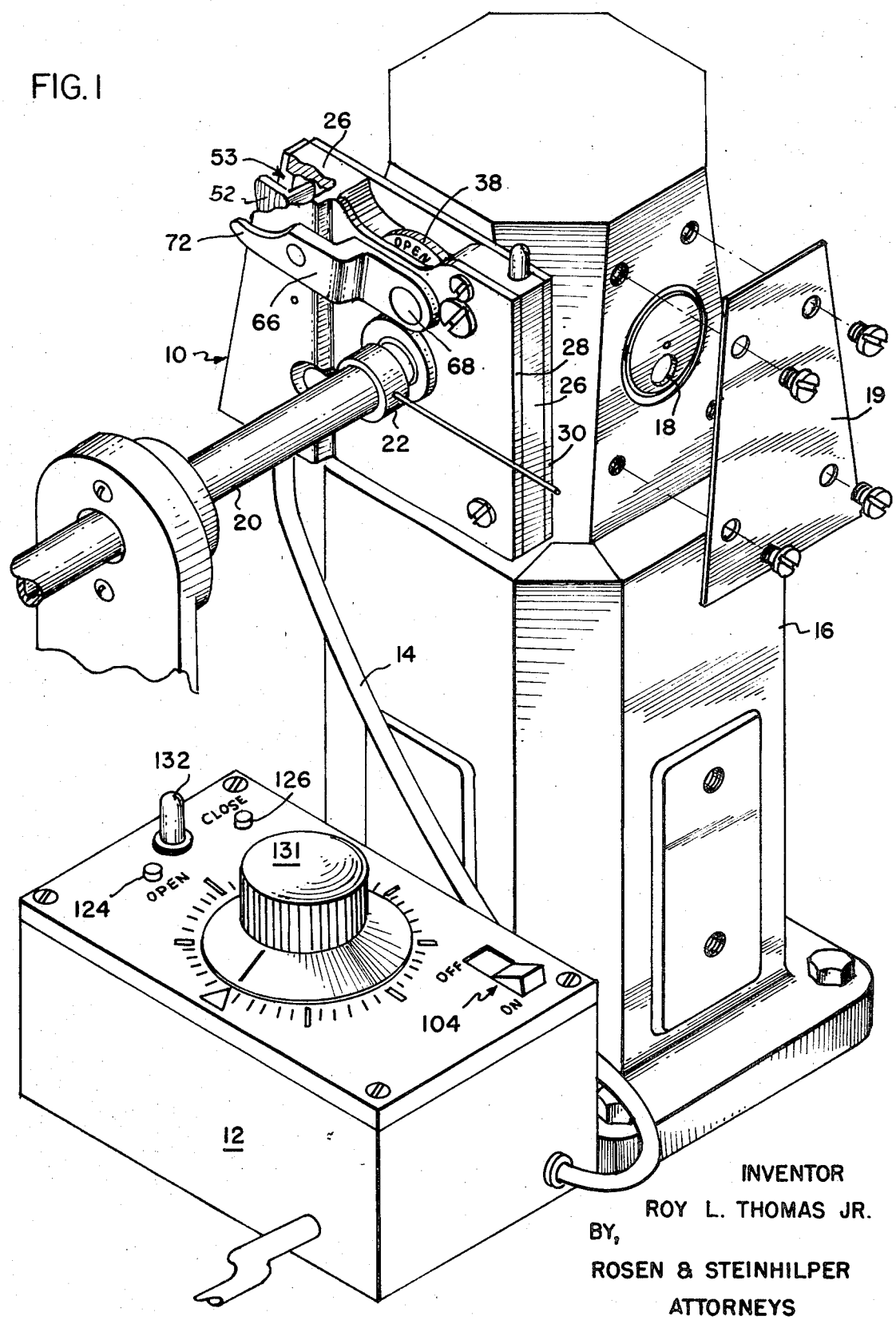

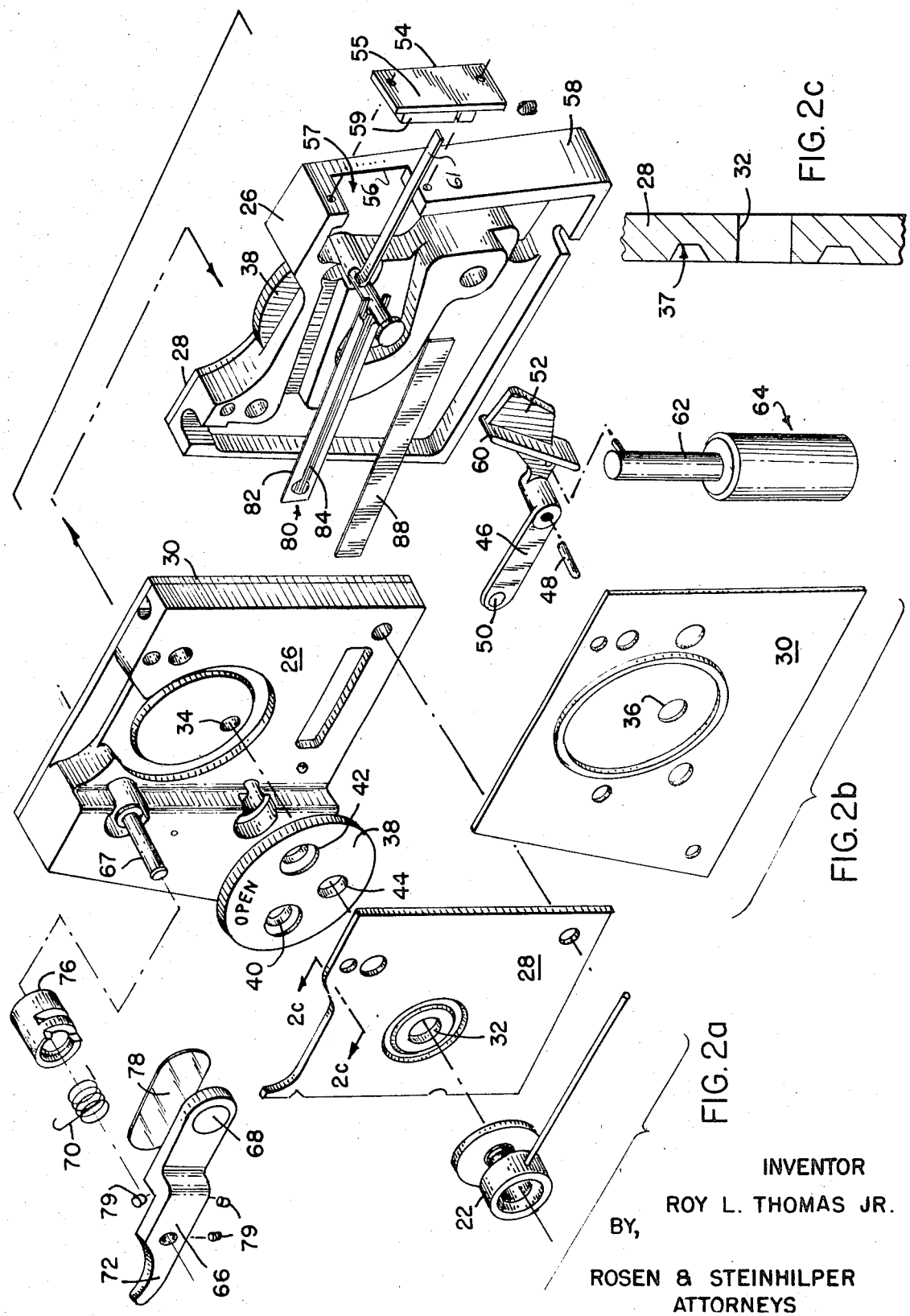

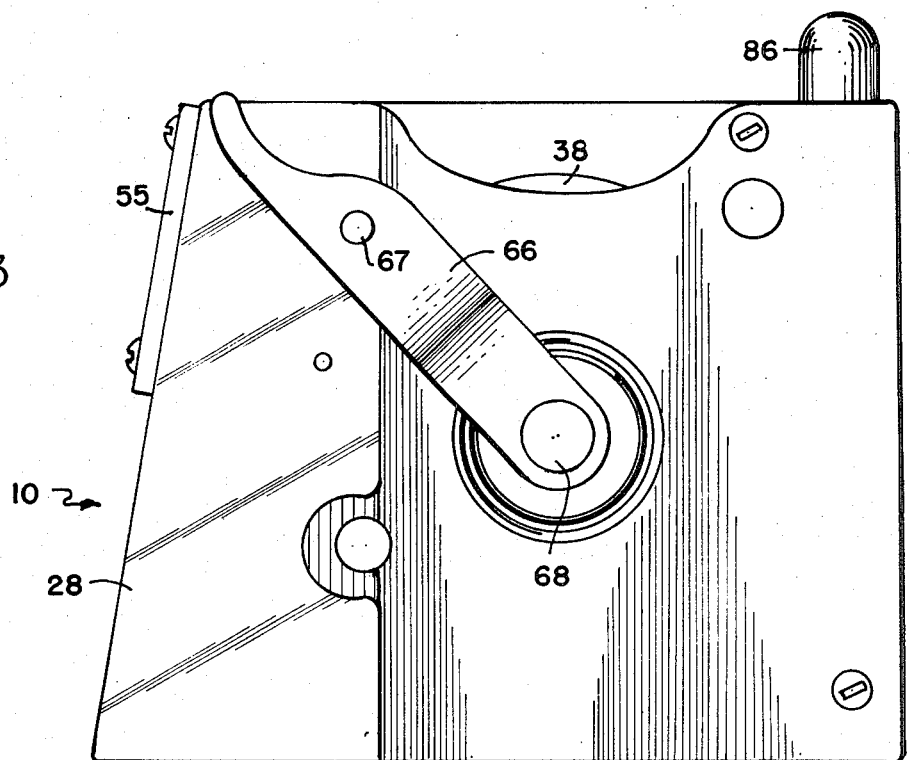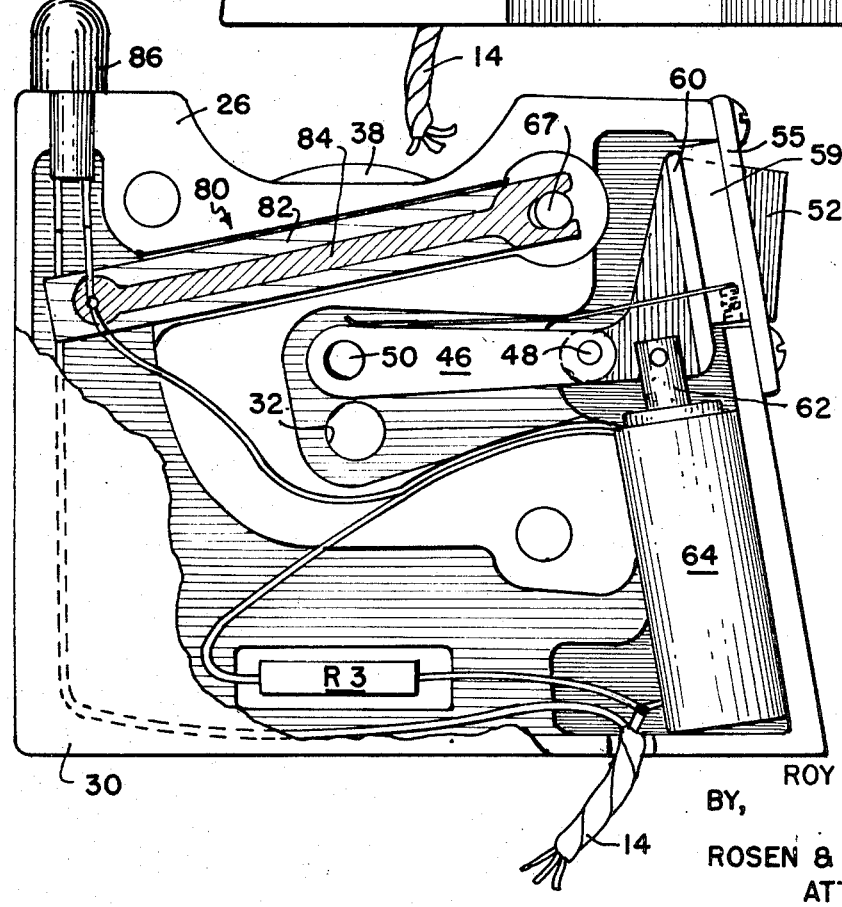

3,721,826
FAIL-SAFE HIGH-ENERGY RADIATION SHUTTERING APPARATUS
Roy L. Thomas, Jr., Medway, Mass., assignor to Charles Supper Company, Incorporated, Natick, Mass.
Filed Aug. 5, 1970, Ser. No. 61,292
Int. Cl. G21f 5/04; H01j 35/16
U.S. Cl. 250—105     16 Claims

ABSTRACT OF THE DISCLOSURE

Shuttering apparatus for controlling and signaling of the passage of high-energy radiation is disclosed as including a shutter containing a normally closed gate which is opened by energizing a solenoid actuator through a control circuit. The control circuit includes a novel interlock which prevents energization of the solenoid except when a beam-receiving means (a beam tunnel, for example) is properly interfaced with the shutter. An inerrant mechanical flag indicator is off-set from the gate and baffled in a novel manner to preclude escape of scattered radiation. The apparatus includes other safety features for maximizing user protection against accidental or inadvertent exposure to radiation.

BACKGROUND OF THE INVENTION

The dangers attending the use of high energy radiation producing or exploiting equipment are well known. The interfacing of a source of such radiation with apparatus employing the radiation and the shuttering of the radiation are apt to create a particularly hazardous situation. Present-day shuttering and interfacing apparatus and prior art teachings in this respect have fallen short of providing optimum safety for the user.

OBJECTS OF THE INVENTION

It is an object of this invention to provide high energy radiation shuttering apparatus which may be adapted to be attached as an accessory to commercially available sources of high energy radiation, and which provides a means of controlling the emission of radiation from such sources while providing utmost protection for users against inadvertent exposure thereto.

It is another object of this invention to provide safety radiation shuttering apparatus adapted to be mounted on a radiation source and having means for preventing opening of the shuttering apparatus except when the shuttering apparatus is properly interfaced with means for receiving the radiation.

It is still another object to provide safety radiation shuttering apparatus having a gate carrying a flag indicator which extends through a slot in the shutter housing, the apparatus being constructed such as to preclude the escape of radiation scattered by the gate through the slot.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a perspective view of a shuttering apparatus according to this invention operatively connected to a commercial X-ray tube housing;

FIGS. 2A and 2B are exploded front and rear views of a shutter constituting part of the FIG. 1 system;

FIG. 2C is a sectional view taken along lines 2C—2C in FIG. 2A;

FIG. 3 is a front elevational view of the shutter shown assembled and with the shutter gate closed;

FIG. 4 is a rear elevational view, partially broken away, showing the shutter with the shutter gate open;

DESCRIPTION OF THE PREFERRED EMBODIMENTS

Figure 5:
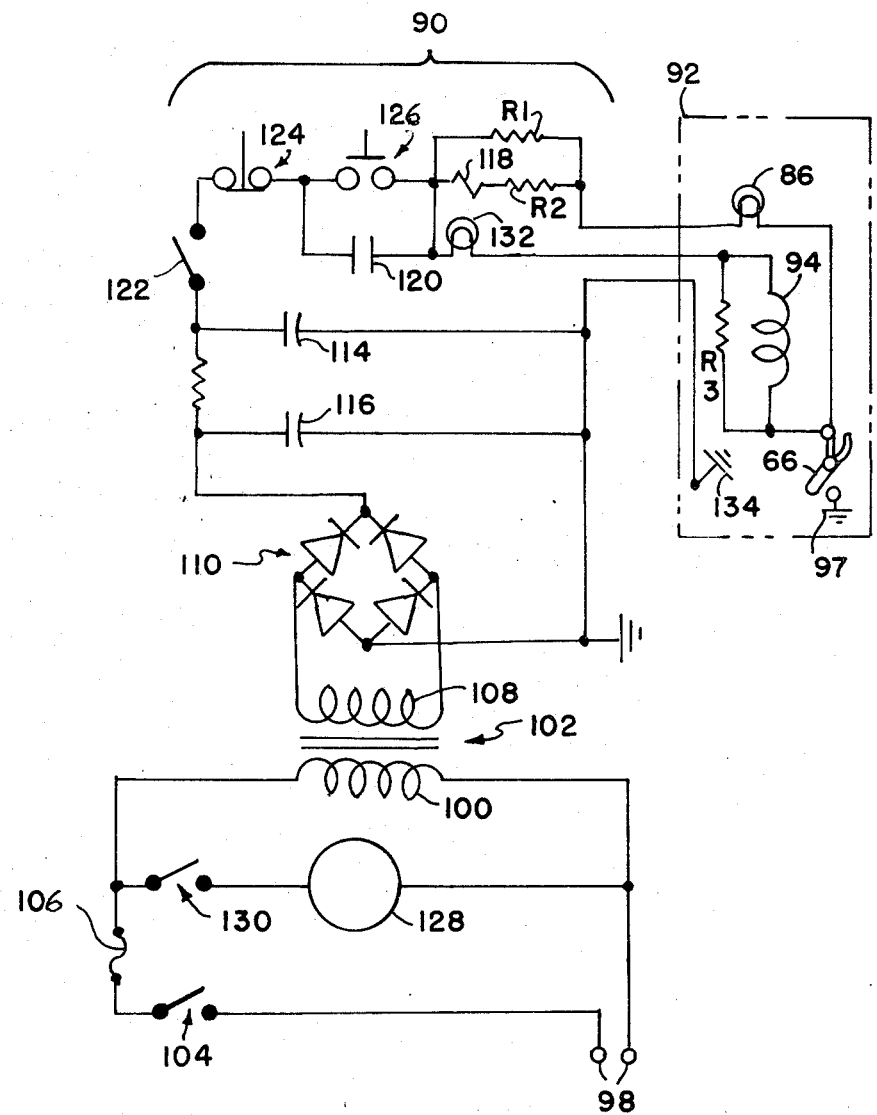
FIG. 5 is a schematic diagram of a control circuit for the shuttering system.

FIGS. 1–5 of the drawings illustrate shuttering apparatus representing a preferred implementation of the principles of the invention, comprising a shutter 10 and a control unit 12 connected to the shutter 10 by control cables 14. In FIG. 1 the shutter 10 is illustrated as being mounted upon a commercially available X-ray tube housing 16 of a well-known type. The tube housing 16 includes a number of ports for passing X-rays. The port 18 is representative. Any unused port is sealed by a cover 19.

The shutter 10 is shown as being interfaced with a collimator 20 of apparatus employing a beam of X-rays (not shown) through a beam tunnel 22 of a standard commercial type.

Referring now to FIGS. 2–4 as well as FIG. 1, the shutter 10 is illustrated as comprising a housing having a main chassis 26, a front plate 28, and a rear plate 30 which cooperate to define a shutter enclosure. Apertures 32, 34, and 36 in the front plate 28, main chassis 26, and rear plate 30 cooperate to define an opening through the shutter 10 for the passage of a beam of X-rays from the X-ray tube 16. For reasons which will be pointed out as this description proceeds, in a preferred embodiment the housing is composed of steel or another suitable electrically conductive material.

In accordance with one aspect of this invention, as shown with particular clarity in FIG. 2C, front plate 28 has an annular recess 37 with convergently tapered sidewalls surrounding the opening or aperture 32 and concentric therewith. The recess 37 receives a tubular mouth of a beam tunnel or instrument collimator to effectively block scattered radiation. The tapered sidewalls of the recess 37 act to prevent a beam tunnel from lodging in the recess and thus possibly deceiving the control circuit for the apparatus (described below) as to the existence of a safe "shutter open" condition.

The shutter 10 includes a rotatable filter wheel 38 having filters 40, 42 and an unobstructed aperture 44, any one of which filters or aperture may be selected by the operator to control the spectral characteristics of the passed beam.

A primary beam gating means is illustrated as comprising an arm 46 pivoted to rotate on the housing about a pin 48. The arm 46 carries at one end a body of shielding material in the form of a disc 50, preferably composed of lead, which is adapted to be carried by the arm 46 across the shutter opening between beam blocking and unblocking positions. The arm 46 has on the opposite end from the disc 50 an indicator in the form of a flag 52 which is preferably brightly colored for optimum visibility. The flag 52 extends through a slot 53 in a side of the shutter housing into the clear vision of an operator when, and only when, the gating means is open. The slot 53 is defined by an edge 54 of a side plate 55 and the mouth 56 of a cavity 57 in one side wall 58 of the main chassis 26.

In accordance with an aspect of this invention, means are provided for preventing the escape of radiation scattered by the disc 50 through the slot 53 in the shutter housing. To this end, the arm 46 is constructed such that the flag 52 lies in a plane offset from the plane containing the disc 50. By this expedient the slot 53 is not in the direct straight-line path of scattered radiation.

To further minimize the possibility of scattered radiation escaping from the shutter 10, side plate 55 carries a baffle 59 extending in a plane between the spaced planes carrying the disc 50 and the flag 52. The baffle 59 thus acts to block any radiation which might be scattered out of the plane of the disc 50 toward the slot 53. Shield 60 on arm 46 also acts to block stray radiation.

Consider now the operation of the primary gating means above described. The arm 46 is held in a normally closed position by a leaf-type spring 61 mounted on the housing 24. As shown with particular clarity in FIG. 4, the arm 46 is pivotally connected to the plunger 62 of a solenoid 64. Energization of the solenoid 64 through a control circuit (to be described in detail hereinafter) causes the plunger 62 to retract into the solenoid 64 and pivot the arm 46 in a clock-wise direction against the bias of spring 61 to a beam unblocking position. Deenergization of the solenoid for any reason whatsoever causes the solenoid 64 to release the arm 46 and allow it to return under the influence of spring 61 to its rest position over the shutter opening.

Thus, by the described aspect of this invention, a primary radiation gate is provided which carries as an integral part thereof an inerrant flag indicator which indicates absolutely whether the shutter is open or closed. Because of the integral mechanical connection between the flag 52 and the shuttering element (the disc 50 in the illustrated embodiment), there is effectively no possibility of error in the indication exhibited by the flag 52. A further feature of this arrangement is that the flag 52 can be used as a shutter actuating element; depression of the flag into the shutter enclosure closes the shutter unambiguously.

In accordance with another aspect of this invention an interlock is provided to assure a proper interfacing of the shutter 10 with a beam-receiving means before the shutter 10 may be opened. The beam-receiving means is here shown as a beam tunnel 22; alternatively the beam-receiving means may be a collimator of a radiation-utilizing instrument.

In the illustrated embodiments the interlock is illustrated as including an electrically conductive element, here shown by way of example as a manually operable interlock finger 66. The finger 66 carries at one end a disc 68 of shielding material, preferably lead, allowing the finger to serve as an auxiliary beam gating member. The finger 66 is normally biased in a clockwise direction (in FIG. 1) by a coil spring 70; the member may be rotated in a counterclockwise direction to move the disc 68 away from the shutter opening by manual depression of the opposed end 72 of the finger 66.

As will be explained in more detail hereinafter, the finger 66 and its pivot pin 67 constitute series-connected elements in a control circuit which controls the energization of the solenoid 64 and thus the opening of the shutter 10. To this end the finger 66 and pin 67 are formed from an electrically conductive material, such as steel, and are electrically insulated from the housing 24. The insulation of the finger 66 and pin 67 is achieved by an insulating sleeve 76 on the pin 67, an insulating pad 78 affixed to the back of the finger 66 and a plurality of insulating buttons 79.

A brush 80, here shown in the form of a printed circuit having an insulated backing 82 and an electrically conductive strip 84 disposed thereon, engages the pin 67 to make electrical contact therewith. The strip 84 is electrically connected to the solenoid 64 and an indicator light 86 by conventional wiring and wiring connections (not shown). An insulating member 88 registered with the conductive strip 84 on the brush 80 insulates the strip 84 to prevent any possible shorting of the strip 84 to the shutter housing or electrical circuitry.

In order that the operation and safety characteristics of the interlock and the system in toto may be fully understood, a description of the control circuit for the shutter will now be engaged. Referring particularly to FIG. 5, the control circuit comprises a control unit section 90 and a shutter section 92. The shutter section 92 of the control circuit includes as primary components a solenoid coil 94, indicator lamp 86, and interlock finger 66. A current carrying resistor $R_3$ is connected in parallel with the solenoid coil 94. The finger 66 is shown in the form of a switch, which, when closed, makes electrical union with a ground 97. Structurally, the finger 66 is grounded to the shutter housing through the beam-receiving means (here beam tunnel 22) when the shutter 10 is properly interfaced with the beam tunnel 22, as shown in FIG. 1.

The control unit section 90 of the control circuit comprises input terminals 98 for receiving a 115 volt, 60 cycle supply. Line voltage is applied to the primary coil 100 of a step-down transformer 102 through a master switch 104 and a fuse 106. The secondary coil 108 of the transformer 102 applies a reduced voltage (e.g. 24 volts) to a conventional full-wave rectifier 110. The output from the rectifier 110 is smoothed through an R-C $\pi$-type filter comprising resistor 112 and capacitors 114, 116.

The primary control function in the control circuit is provided by a relay shown as comprising a relay coil 118 and relay contacts 120. The relay coil 118 is connected in series with indicator lamp 86 on the shutter 10 through a voltage-dropping resistor $R_2$ and switches 122, 124, and 126. $R_1$ is a current-carrying resistor. Switch 122 is cam-actuated by a timing motor 128, in turn energized through a switch 130, also cam-actuated. A knob 131 on control unit 12 is used to set the timing motor 128. Switch 124 is a manually operable, normally closed switch; switch 126 is a manually operable, normally open switch. The relay contacts 120 are connected in series with solenoid coil 94 through an indicator lamp 132 mounted on the control unit 12.

In operation, assuming that the master switch 104 is closed, that the shutter 10 is properly interfaced with the beam tunnel 22 (verified by completion of an electrical circuit through the finger 66 and beam tunnel 22 to ground 97 through the shutter housing), and that the power circuit is otherwise completed, then depression of the normally open switch 126 energizes the relay coil 118, thereby closing relay contacts 120 and allowing current to flow through the solenoid coil 94 to open the shutter. It can be seen that the shutter will not open if the circuit is broken for any of the following reasons: (1) the indicator lamp 132 is defective; (2) if the interlock is not closed (meaning the shutter 10 is not properly interfaced with the beam-receiving means); (3) if the control circuit is defective or not properly grounded to the shutter housing (shown schematically in FIG. 5 as a ground connection 134); (4) if the switch 122 actuated by timing motor 128 is not closed; or (5) if the master switch 104 is open.

The control circuit thus provides safe control and signaling of the passage of radiation through the shutter 10. If at any time while the shutter is in an open condition the collimator 20 or beam tunnel 22 should be withdrawn, or the shuttering system should experience a broken wire, a power failure, a lamp burn-out or any other abnormal condition, the relay contacts 120 will be broken, de-energizing the solenoid coil 94 and closing the shutter. The shutter cannot then be reopened until the defect is remedied, except in the case of a burn-out of lamp 86 on the shutter 10, in which event the shutter can be maintained open by holding down normally open switch 126. In this event, the shutter open condition is indicated by the energization of indicator lamp 132 on the control unit 12, and the presence of flag 52.

It is seen that by this invention a safety shutter is provided which minimizes the danger of exposure to high energy radiation either by escape of radiation from the shutter or inadvertent exposure through an open shutter. This is accomplished in part by the use of an electrical control circuit providing visible indicators on both the control unit 12 and the shutter 10, and an inerrant mechanical flag indicator. These systems in cooperation make it substantially impossible to receive an inadvertent exposure to radiation unless all safeguards are deliberately violated.

Figure 6:
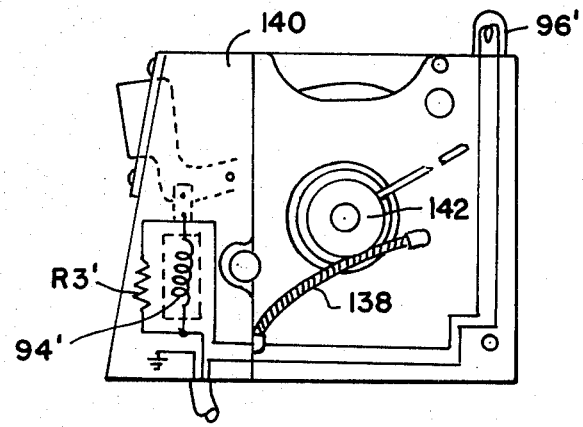
FIGS. 6 and 7 disclose alternative embodiments of interlock means constituting one aspect of the invention.
Figure 7:
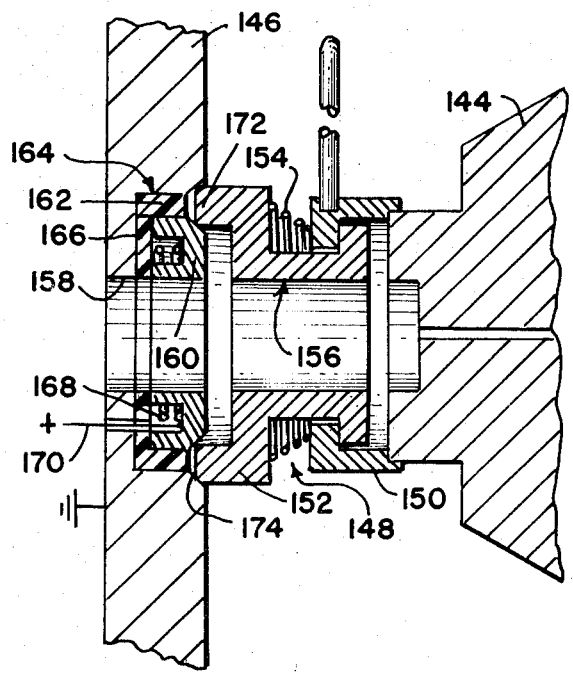

The invention is not limited to the particular details of construction of the embodiments depicted, and it is contemplated that various and other modifications and applications will occur to those skilled is the art. For example, FIGS. 6 and 7 show alternative embodiments of the interlock constituting an aspect of the invention. In the FIGS. 6 and 7 embodiments, primed reference numerals connote structure which may be of the same general form as that denoted in the FIGS. 1–5 embodiment by the corresponding unprimed reference numerals. In the FIG. 6 shutter an electrically conductive spring 138 has been substituted for the finger 66 in the FIGS. 1–5 embodiment. As in the FIGS. 1–5 embodiment, the FIG. 6 shutter includes a shutter housing 140 and a portion of a control circuit including a resistor R'$_3$ in parallel with a solenoid coil 94'. The resistor R'$_3$ and coil 94' are connectable to the grounded shutter housing 140 through the spring 138 when the spring is engaged with a beam tunnel 142 (or instrument collimator) which is properly interfaced with the shutter housing 140. An indicator lamp 96' is also connectable to the grounded shutter housing 140 through the spring 138.

In its rest state, the spring 138 extends into the locus of travel of a beam-receiving means (the collimator of an instrument or a beam tunnel) being interfaced with the shutter housing. Proper interfacing of the beam-receiving means with the housing 140 deflects the spring 138 radially outwardly against the restorative force thereof, providing a firm electrical union between the spring 138 and the beam-receiving means. As described above, the beam-receiving means, when properly interfaced, makes electrical unit with the shutter housing 140 to complete the control circuit through the spring 138, beam-receiving means, and shutter housing 140.

FIG. 7 shows stil another interlock embodiment. In FIG. 7, an instrument 144 is interfaced with an electrically conductive shutter housing 146 through a beam tunnel 148. The beam tunnel 148 shown is of well-known construction, comprising a body 150, normally composed of steel, and a collar 152 which is slidable on the body 150. A coil spring 154 interposed between the body 150 and collar 152 provides a spring bias urging the body 150 and collar 152 in opposed directions. The beam tunnel 148 has a bore 156 registrable with an opening 158 in the shutter housing 146.

In this embodiment an electrically conductive piston 160 is mounted for axial travel in a bore defined by an insulating ring 162 set in a recess 164 surrounding the opening 158. An insulating pad 166 electrically isolates the piston from the shutter housing 146. A coil spring 168 acting between the pad 166 and the piston 160 normally biases the piston 160 forwardly along the axis of the opening 158 beyond the shutter housing 146 such that the piston makes initial engagement with the beam-receiving means (here shown as beam tunnel 148) being interfaced with the shutter housing 146. The electrically conductive piston 160 is connected by a lead 170 to the output end of the electrical actuating means for the radiation gate (shown in each of the embodiments above-described as a solenoid). The shutter housing, as shown, is grounded.

In operation, an instrument 144 is brought into spaced adjacency to the opening 158 in the shutter housing 146. The beam tunnel 148 is inserted between the instrument 144 and the shutter housing 146 with a tubular mouth 172 thereof mating with a groove 174 defined by the insulating ring 162 and beveled surfaces on the shutter housing 146 and piston 160. The tubular mouth 172 on the beam-receiving means makes initial engagement with the piston 160, forcing the piston axially rearwardly until the mouth 172 engages the shutter housing 146 to complete an electrical circuit between the piston 160 and the shutter housing 146. As described above, completion of this circuit readies the control circuit for actuation of the gate actuating means (the solenoid) and readies for energization the indicator lamp on the shutter housing.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. Safety high energy radiation shuttering apparatus, comprising:
   shutter housing means having an opening for passing a beam of radiation;
   electrically conductive ground terminal means adjacent said opening;
   normally closed gating means in said housing means for selectively blocking and unblocking said opening;
   actuating means including an electrical control circuit for controlling the actuation of said gating means; and
   interlock means including a movable electrically conductive member, said member being electrically connected in said control circuit such that engagement of said member with an electrically conductive beam-receiving means properly interface with said shutter housing means completes an electrical circuit through said member, the beam-receiving means and said ground terminal means, whereby said gating means can be actuated through said control circuit only when a beam-receiving means is properly interface with said shutter housing means.

2. The apparatus defined by claim 1 wherein said conductive member is a metal finger having a radiation shielding body on an end thereof, said apparatus including means mounting said finger for pivotal movement of said shielding body across said opening.

3. The apparatus defined by claim 1 wherein a front face of said housing means has an annular recess with convergently tapered side walls surrounding said opening and concentric therewith for receiving a tubular mouth on a beam-receiving means.

4. The apparatus defined by claim 1 wherein said shutter housing means has a slot in a side thereof and wherein said gating means includes an arm and means mounting said arm for pivotal movement, said arm having at one end radiation shielding means and at the opposed end a flag extending through said slot, said flag being visible outside said housing only when said gating means is open, said arm and shutter housing means being constructed such that said slot and said flag are off-set from said shielding means to minimize the possibility that radiation scattered by said shield may escape from said housing means through said slot.

5. A safety shuttering apparatus for controlling and signaling of the passage of high energy radiation from a port in a radiation source, comprising:
   shutter housing means adapted to be mounted on a source means and having an opening registrable with a port in the source;
   normally closed gating means and means mounting said gating means for movement from a radiation blocking position across said opening to a radiation unblocking position away from said opening;
   electrically energizable actuating means coupled to said gating means for opening said gating means when energized;

an electrical control circuit for selectively electrically connecting said actuating means to electrical power terminals;

interlock means for assuring a proper interfacing of said housing means with an electrically conductive beam-receiving means, said interlocking means comprising:

electrically conductive ground terminal means adjacent said opening, an electrically conductive element connected in said control circuit and being electrically insulated from said ground terminal means, and means for spacing said conductive element and said ground terminal means such that said conductive element and said ground terminal means are electrically isolated when a beam-receiving means is not properly interfaced with said housing means, but such that said conductive element and said ground means are electrically joined through the beam-receiving means to complete said control circuit through said conductive element, the beam-receiving means and said ground terminal means when a beam-receiving means is properly interfaced with said apparatus; and electrical signaling means in said control circuit for signaling, when said circuit is completed, that said gating means is open and that a beam-receiving means is properly interface with said housing means of said shuttering apparatus.

6. A safety shuttering apparatus for controlling and signaling of the passage of high energy radiation from a port in a radiation source, comprising:

shutter housing means adapted to be mounted on a source means and having an opening registrable with a port in the source;

normally closed gating means and means mounting said gating means for movement from a radiation blocking position across said opening to a radiation unblocking position away from said opening;

electrically energizable actuating means coupled to said gating means for opening said gating means when energized;

an electrical control circuit for selectively electrically connecting said actuating means to electrical power terminals;

interlock means for assuring a proper interfacing of said housing means with an electrically conductive beam-receiving means, said interlock means comprising:

electrically conductive ground terminal means adjacent said opening, an electrically conductive element connected in said control circuit and being electrically insulated from said ground terminal means, support means mounting said conductive element to extend into the locus of travel of a beam-receiving means being interfaced with said housing means, at least one of said conductive element and said support means including spring means allowing said conductive element to be deflected upon engagement with a beam-receiving means, said support means spacing said conductive element and said ground terminal means such that said conductive element and said ground terminal means are electrically isolated when a beam-receiving means is not properly interfaced with said housing means, but such that said conductive element and said ground terminal means are electrically joined to complete said control circuit through said conductive element, the beam-receiving means and said ground terminal means when a beam-receiving means is properly interfaced with said apparatus; and electrical signaling means in said control circuit for signaling, when said circuit is completed, that said gating means is open and that a beam-receiving means is properly interfaced with said housing means of said shuttering apparatus.

7. The apparatus defined by claim 6 wherein said conductive means comprises a rigid finger and wherein said support means mounts said finger to pivot into and out of said locus of travel of a beam-receiving means, said spring means comprising a torsion spring acting on said finger to bias said finger into a position in said locus of travel.

8. The apparatus defined by claim 6 wherein said conductive member is a spring.

9. The apparatus defined by claim 6 wherein said housing means constitutes said ground terminal means, wherein said apparatus includes annular insulating means set in a recess surrounding said opening in said housing means, wherein said electrically conductive member comprises a centrally apertured piston, wherein said support means mounts said piston for axial movement into and out of said locus of travel, said insulating means electrically isolating said housing means and said piston, said insulating means being radially narrower than a cylindrical mouth of a beam-receiving means whereby when an electrically conductive beam-receiving means is properly interfaced with said apparatus the said mouth thereof electrically bridges said piston and said housing means to effect said completion of said control circuit.

10. The apparatus defined by claim 6 wherein said spring means biases said piston forwardly along the axis of said opening beyond said shutter housing so as to make initial engagement with a beam-receiving means being interfaced with said housing means.

11. The apparatus defined by claim 6 wherein said shutter housing means has a slot in a side thereof and wherein said gating means comprises an arm mounted for pivotal movement, said arm having at one end radiation shielding means and at the opposed end a flag extending through said slot, said flag being visible outside said housing only when said gating means is open, said arm and shutter housing means being constructed such that said slot and said flag are off-set from said shielding means to minimize the possibility that radiation scattered by said shield may escape from said housing through said slot.

12. The apparatus defined by claim 11 wherein a face of said shutter housing means adapted for engagement with the beam-receiving means has an annular recess with convergently tapered sidewalls surrounding said opening and concentric therewith for receiving a tubular mouth on a beam-receiving means, said recess blocking scattered radiation, the tapered sidewalls acting to prevent a beam tunnel from lodging in the recess and thus possibly deceiving the control circuit as to the existence of a safe shutter open condition.

13. The apparatus defined by claim 12 wherein said conductive means comprises a rigid finger and wherein said support means mounts said finger to pivot into and out of said locus of travel of a beam-receiving means, said spring means comprising a torsion spring acting on said finger to bias said finger into a position in said locus of travel.

14. The apparatus defined by claim 12 wherein said conductive member is a spring.

15. The apparatus defined by claim 12 wherein said housing means constitutes said ground terminal means, wherein said apparatus includes annular insulating means set in a recess surrounding said opening in said housing means, wherein said electrically conductive member comprises a centrally apertured piston, wherein said support means mounts said piston for axial movement into and out of said locus of travel, said insulating means electrically isolating said housing means and said piston, said insulating means being radially narrower than a cylindrical mouth of a beam-receiving means whereby when an electrically conductive beam-receiving means is properly interfaced with said apparatus the said mouth thereof electrically bridges said piston and said housing means to effect said completion of said control circuit.

16. The apparatus defined by claim 12 wherein said spring means biases said piston forwardly along the axis of said opening beyond said shutter housing so as to make initial engagement with a beam-receiving means being interfaced with said housing means.

References Cited

UNITED STATES PATENTS 3,060,316 10/1962 Peyser _____ 250—105
3,418,475 12/1968 Hudgens _____ 250—105

WILLIAM F. LINDQUIST, Primary Examiner

U.S. Cl. X.R.

250—106 S